United States Patent [19]

Watanabe

[11] Patent Number: 4,623,937

[45] Date of Patent: Nov. 18, 1986

[54] SCANNING APPARATUS

[75] Inventor: Junji Watanabe, Yokohama, Japan

[73] Assignee: Kabushiki Kaisha Toshiba, Kawasaki, Japan

[21] Appl. No.: 635,883

[22] Filed: Jul. 30, 1984

[30] Foreign Application Priority Data

Jul. 29, 1983 [JP] Japan .................................. 58-138824

[51] Int. Cl.⁴ ............................................. H04N 1/32
[52] U.S. Cl. .................................... 358/285; 358/293; 358/901; 355/145 H; 250/578
[58] Field of Search ............... 358/293, 285, 294, 901; 250/578; 355/145 H

[56] References Cited

FOREIGN PATENT DOCUMENTS 52-123625 10/1977 Japan .
58-46764 3/1983 Japan .................................. 358/293
58-56570 4/1983 Japan .

OTHER PUBLICATIONS

M. Sokolski "Fiber Optic Read Head" IBM Technical Disclosure Bulletin, vol. 8, No. 6, 11-68, pp. 879-80.

Primary Examiner—James J. Groody
Assistant Examiner—Edward L. Coles
Attorney, Agent, or Firm—Cushman, Darby & Cushman

[57] ABSTRACT

A scanning apparatus for scanning image information of a document and generating image information has a document table for supporting a document thereon and an exposure lamp for exposing the document supported on the document table. The scanning apparatus further has a mirror for changing the direction of light reflected by the document illuminated by the exposure lamp, a rod lens array for optically converging light from the mirror, and a CCD image sensor for receiving light converged by the rod lens array and transducing the incident light to an electrical signal. The light reflected by the document is directed along the longitudinal direction of the document table. The optical axis of the rod lens is parallel to the longitudinal direction of the document table, thereby obtaining a scanning apparatus having a reduced height.

18 Claims, 17 Drawing Figures

F I G. 11
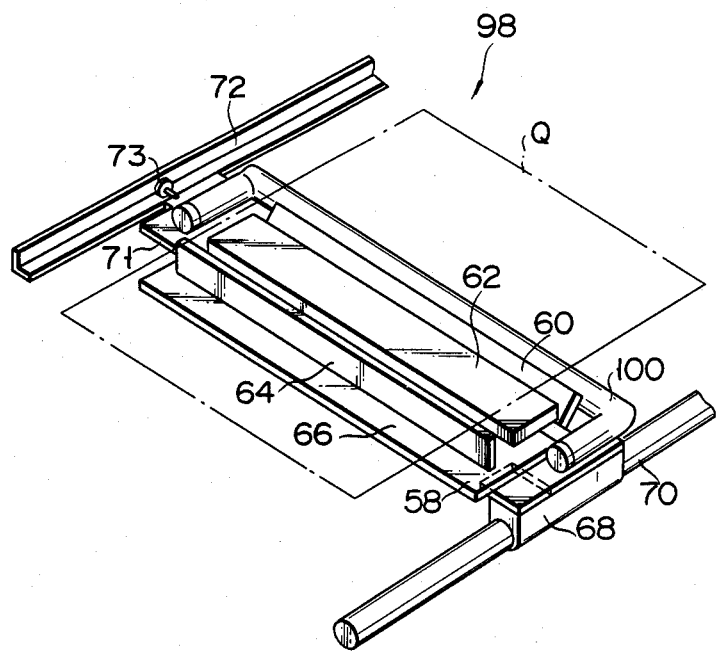
F I G. 12
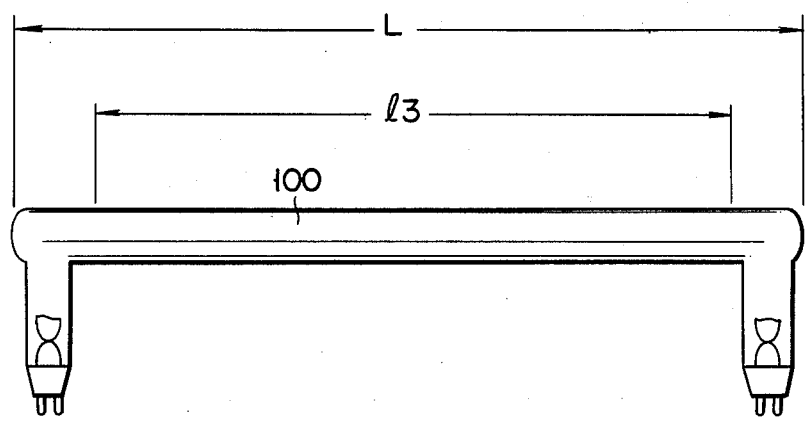

SCANNING APPARATUS

BACKGROUND OF THE INVENTION

The present invention relates to a scanning apparatus for scanning image information of a document and generating a signal corresponding to the image information.

A scanning apparatus is used in a facsimile system or a printer having a copying function to scan image information (characters or image) of a document to be copied and to generate a signal corresponding to this image information.

A conventional scanning apparatus 2 is illustrated in FIG. 1. The apparatus 2 has a lamp 4 for exposing a document, a rod lens (light converging glass fibers) 5 for converging light reflected by the document and a photoelectric transducer element 6 for receiving light through the rod lens 5, and transducing an optical signal to an electrical signal arranged under a document table 3 for supporting a document. In this conventional scanning apparatus 2, the rod lens 5 is arranged such that the optical axis thereof is substantially perpendicular to the document placed on the document table 3. In other words, the longitudinal axis of the rod lens 5 is substantially perpendicular to the document table 3. For this reason, the height of the apparatus 2 is increased in accordance with the length of the optical axis of the rod lens, resulting in a disadvantage. In other words, the apparatus becomes large as a whole.

SUMMARY OF THE INVENTION

It is an object of the present invention to provide a compact scanning apparatus.

According to an aspect of the present invention, there is provided a scanning apparatus for scanning image information of a document and for generating a signal corresponding to the image information. The scanning apparatus comprises a document table for supporting the document; an exposing means for illuminating and exposing the document supported on said document table; a direction changing means for changing the direction of light reflected by the document illuminated by said exposing means along a direction parallel to the length of said document table; a light-converging means for optically converging the light from said direction changing means, said light-converging means being arranged along the direction parallel to the length of said document table; and a photoelectric means for receiving the light passing through said light-converging means and for transducing the light to an electrical signal.

BRIEF DESCRIPTION OF THE DRAWINGS

FIG. 11 is a perspective view of the main part of a scanning apparatus according to a sixth embodiment of the present invention;

FIG. 12 is a plan view of an exposure lamp used in the scanning apparatus shown in FIG. 11;

DETAILED DESCRIPTION OF THE PREFERRED EMBODIMENTS

Figure 1:
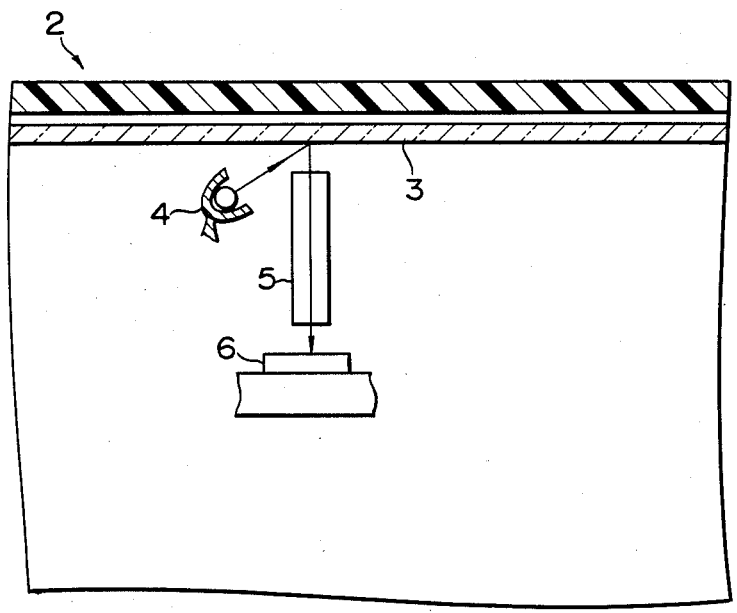
FIG. 1 is a schematic representation showing the main part of a conventional scanning apparatus.
Figure 2:
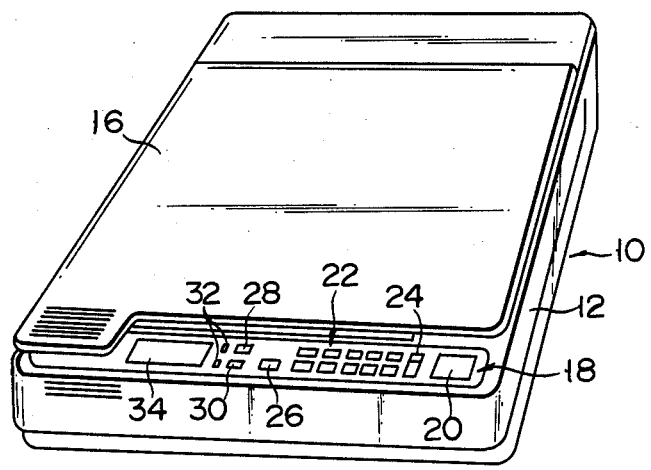
FIG. 2 is a perspective view of a scanning apparatus according to an embodiment of the present invention.

Preferred embodiments of the present invention will be described in detail with reference to FIGS. 2 to 17.

A scanning apparatus according to a first embodiment of the present invention will be described with reference to FIGS. 2 to 5. A scanning apparatus 10 of this embodiment has a case 12 having a function for transducing image information into an electrical signal. A document table 14 (FIG. 5) is made of a transparent material and is formed on the upper portion of the case 12 so as to support a document. A document cover 16 is fixed on the document table 14 so as to cover the document placed on the document table 14 as needed. An operation panel 18 is arranged in the upper portion of the case 12. The operation panel 18 has a print key 20 for starting printing, ten keys 22 for specifying a print number, a clear/stop key 24 for cancelling the preset print number and stopping printing operation, a number display unit 26 for displaying a printed sheet number, a halftone key 28 for specifying a halftone mode for full-color image and the density thereof, mode keys 30 for specifying a monotone or 7-color mode and the density thereof, a mode display unit 32 for displaying the preset mode, and a display unit 34 for performing various types of display.

Figure 3:
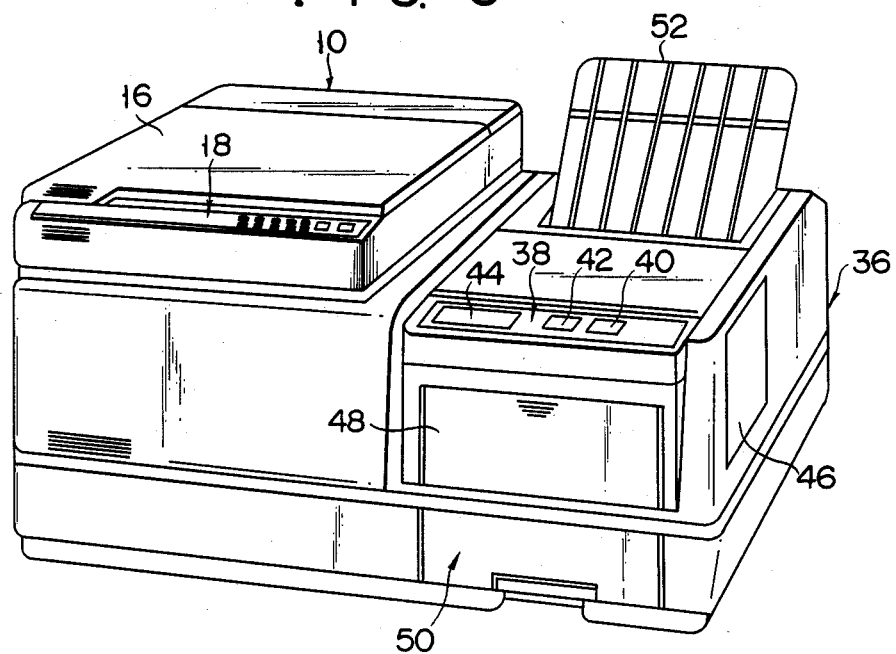
FIG. 3 is a perspective view of an image forming apparatus using a scanning apparatus as shwon in FIG. 2.

As shown in FIG. 3, the scanning apparatus 10 is coupled to an image forming apparatus 36 for forming an image corresponding to the image information signal generated from the scanning apparatus 10.

In the image forming apparatus 36, an image is formed on paper in accordance with the image information signal from the scanning apparatus 10. In other words, the document can be copied. An operation panel 38 is formed on the front upper portion of the image forming apparatus 36. The operation panel 38 has an on-line scanner key 40 for receiving the image information signal from the scanning apparatus 10, an eject key 42 for ejecting a ribbon cassette (not shown) containing an ink ribbon mounted in the image forming apparatus 36, and a display unit 44 for displaying a selected operation mode. A door 46 is mounted on the image forming apparatus 36 and is freely opened/closed to eject or load the ribbon cassette. A manual feed guide plate 48 is mounted on the front wall of the image forming apparatus 36 and is freely opened/closed to allow the operator to manually feed a paper sheet in the manual feed mode. The guide plate 48 can be opened in the manual feed mode, so that an operator can manually feed a paper sheet thereinto. A paper cassette 50 is detachably mounted under the guide plate 48 to automatically feed a paper sheet in the automatic print mode. An inclined discharge tray 52 is disposed at the upper portion of the image forming apparatus 36 and holds copied paper sheets.

Figure 4:
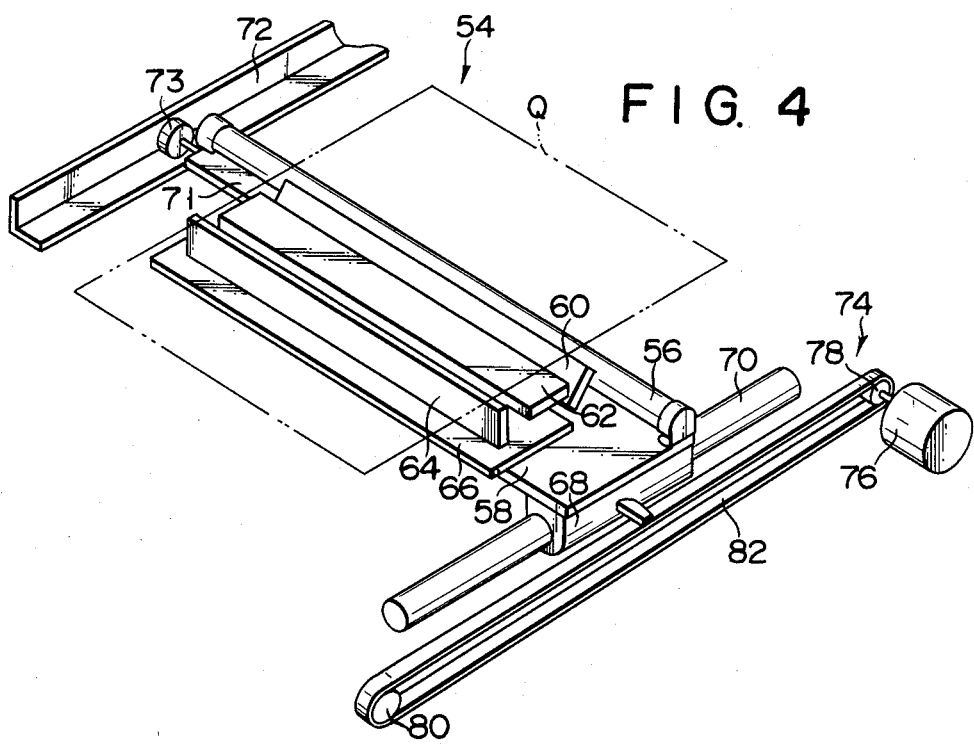
FIG. 4 is a perspective view showing the main part of the scanning apparatus of FIG. 2.
Figure 5:
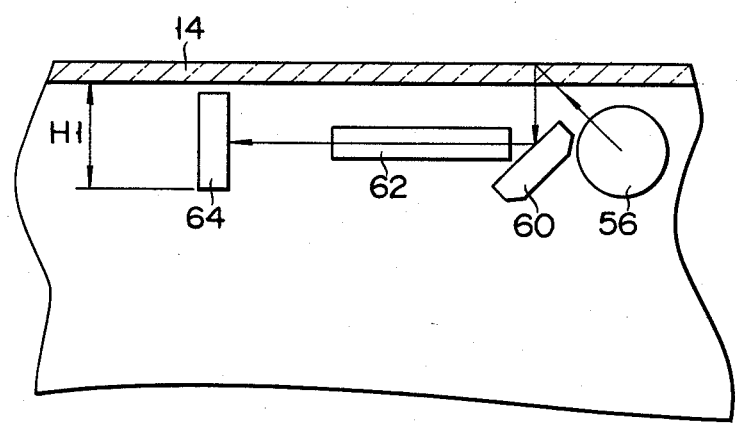
FIG. 5 is a front view schematically showing the construction of the main part of the scanning apparatus of FIG. 2.

As shown in FIG. 4, a scanning unit 54 is mounted in the scanning apparatus 10 so as to be movable along the document table 14 (FIG. 5). A lamp (exposing means) 56 is linearly disposed in the scanning unit 54 along the width of the document table 14 so as to illuminate and thereby expose a document Q on the document table 14. The lamp 56 is supported by a carriage 58 which can be reciprocally moved. A mirror (direction changing means) 60 is fixed on the carriage 58 to change the direction of light reflected by the document Q when the document Q is illuminated with light from the lamp 56. The reflected light from the document Q is directed by the mirror 60 to be substantially parallel to the document table 14, as shown in FIG. 5. A rod lens array as light converging fibers (light converging means) 62 for converging the reflected light and a charge-coupled device image sensor or CCD image sensor 64 (photoelectric means) for receiving light transmitted through the rod lens array 62 and converting the optical signal to an electrical signal are fixed on the carriage 58. The lamp 56, the mirror 60, the rod lens array 62 and the CCD image sensor 64 are integrally fixed on the carriage 58. The CCD image sensor 64 is coupled to an amplifier 66 incorporating an amplifying circuit for amplifying an output from the CCD image sensor 64. The amplifier 66 is fixed on the carriage 58 and is parallel to the document table 14 in order to make the apparatus thin. The rod lens array 62 comprises a plurality of rod lenses 67 (to be described in detail later with reference to FIG. 16) and is disposed such that the optical axis of each rod lens 67 is substantially parallel to the light reflected by the mirror 60. In this embodiment, the optical axis of each rod lens 67 and hence the rod lens array 62 is substantially parallel to the document table 14. Since the longitudinal axis of the rod lens array 62 coincides with the optical axis thereof, the longitudinal axis of each rod lens 67 or rod lens array 62 is substantially parallel to the document table 14. In comparison with a conventional scanning apparatus wherein the optical axis of each rod lens is substantially perpendicular to the document table, the height H (FIG. 5) of the scanning unit 54 can be greatly decreased. For example, the conventional scanning apparatus shown in FIG. 1 was about 65 mm in height, using a rod lens array of 20.4 mm in length. However, in this embodiment, using a rod lens of array of 39.5 mm in length, the scanning apparatus was only about 45 mm in height. As compared with the size of the conventional scanning apparatus, the size of the scanning apparatus can be decreased according to the present invention. The rod lens comprises, for example, a SELFOC lens (tradename) to be described later.

An electrical signal generated from the CCD image sensor in response to the optical signal is amplified by the amplifier 66, and is supplied to the image forming apparatus 36. The image forming apparatus 36 thus forms or copies an image in accordance with the image information.

One end 68 of the carriage 58 is slidably supported by a rail shaft 70, and the other end 71 is slidably supported on a rail 72 through a roller 73. The rail shaft 70 and the rail 72 extend parallel to each other and to the document table 14. The end 68 of the carriage 58 is coupled to a drive mechanism 74 for driving the carriage 58 along the rod 70 or the rail 72. A motor 76 is arranged in the drive mechanism 74 in the vicinity of one end of the rail shaft 70. A drive pulley 78 is fixed on the drive shaft of the motor 76. A driven pulley 80 is disposed in the vicinity of the other end of the rail shaft 70. A timing belt 82 is looped around the drive pulley 78 and the driven pulley 80 to be substantially parallel to the rail shaft 70. A projection 84 extends from the end 68 of the carriage 58 and is fixed to part of the timing belt 82. The scanning unit 54 is reciprocally moved along the document table 14 upon energization of the motor 76 so as to scan the document placed on the document table 14.

Other embodiments of the present invention will be described. The same reference numerals used in these embodiments denote the same part as in the first embodiment, and a detailed description thereof will be omitted.

Figure 6:
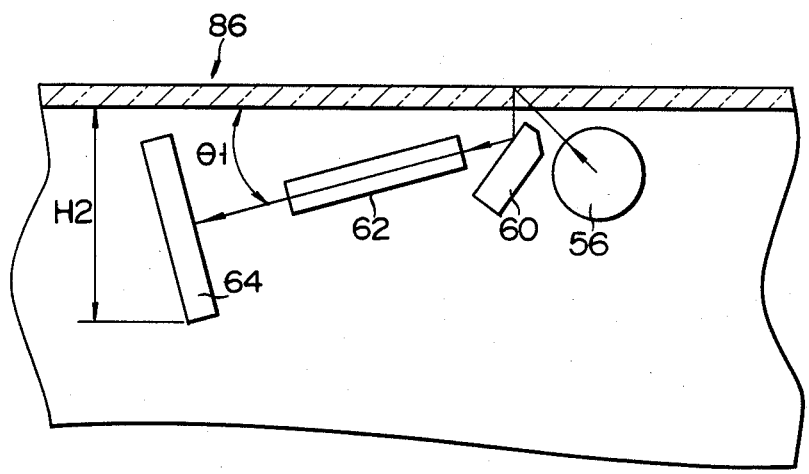
FIG. 6 is a front view schematically showing the construction of the main part of a scanning apparatus according to a second embodiment of the present invention.

In the scanning apparatus 86 according to the second embodiment, as shown in FIG. 6, light reflected by a mirror 60 or the optical axis of a rod lens array 62 is aligned with a line forming an angle $\theta 1$ with respect to the surface of the document table 14. In this case, the inclination of the reflecting surface of the mirror 60 is controlled to adjust the angle $\theta 1$, and the rod lens array 62 is disposed such that the optical axis of each rod lens 67 is aligned with the optical path of light reflected by the mirror 60. A CCD image sensor 64 is arranged such that its light-receiving surface is perpendicular to the optical path. Relation $\theta 1 < 90°$ must be satisfied. When the angle $\theta 1$ becomes small, the height H2 of the scanning unit can be decreased. The dimensions of the scanning apparatus according to the second embodiment can be decreased in the same manner as in the first embodiment.

Figure 7:
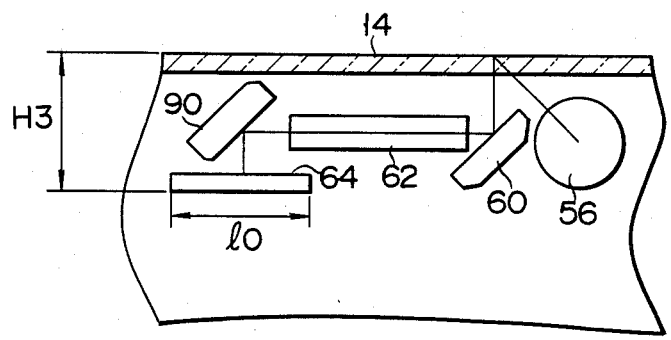
FIG. 7 is a front view schematically showing the construction of the main part of a scanning apparatus according to a third embodiment of the present invention.

A scanning apparatus 88 according to a third embodiment as shown in FIG. 7 is obtained such that a mirror 90 is additionally arranged between the rod lens array 62 and the CCD image sensor 64 of the construction of the first embodiment. The direction of light transmitted through the rod lens array 62 is changed by the mirror 90 so that it changes from a parallel direction with respect to the document table 14 to the perpendicular direction. Therefore, the CCD image sensor 64 can be substantially parallel to the document table 14, and the height H3 of the scanning apparatus will not change even if the width 10 of the CCD image sensor 64 increases. According to the third embodiment, the width H3 of the scanning unit is decreased, and the CCD image sensor 64 having a considerably large size (width 10) can be used.

Figure 8:
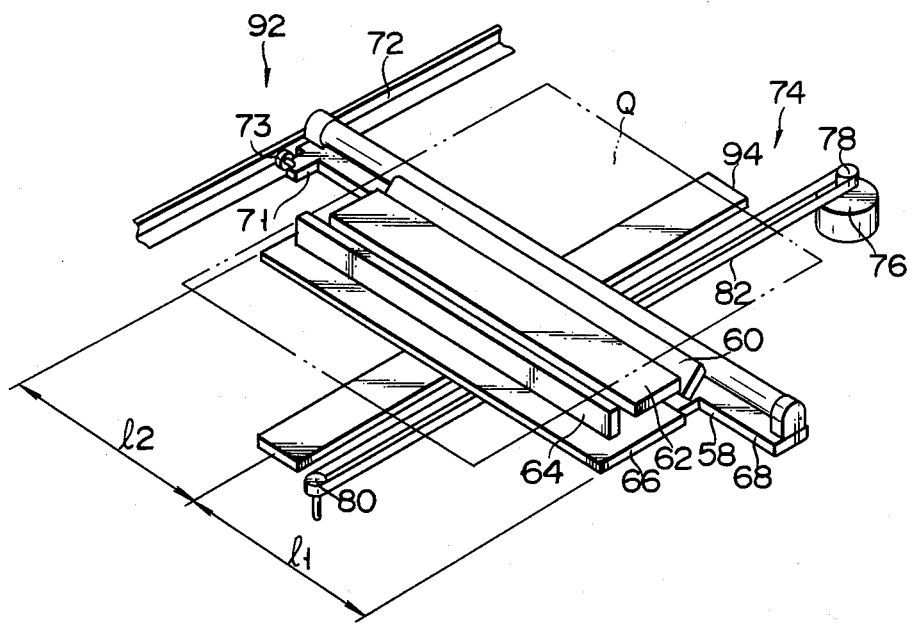
FIG. 8 is a perspective view of the main part of a scanning apparatus according to a fourth embodiment of the present invention.

As shown in FIG. 8, in a scanning apparatus 92 according to a fourth embodiment of the present invention, a drive mechanism 74 is arranged substantially below the central portion of the carriage 58. A guide plate 94 is arranged substantially at the center (l1=l2) of the carriage 58 to support the carriage 58 and guide the movement thereof. Referring to FIG. 8, reference symbol l1 denotes a distance from one end of the carriage 58 to its center; and l2 denotes a distance from the other end of the carriage 58 to its center. According to the fourth embodiment, substantially the center of gravity of the carriage 58 is supported and driven by the guide plate 94, so that the swing of the carriage 58 becomes smaller when the carriage 58 is started or stopped. Therefore, the mechanical strength required of the carriage 58 can be decreased, and thus a lightweight carriage can be used. As a result, the frictional force acting on the guide plate becomes small when the carriage is accelerated or decelerated. Therefore, the carriage 58 can be smoothly moved, and the load acting on the motor becomes small.

Figure 9:
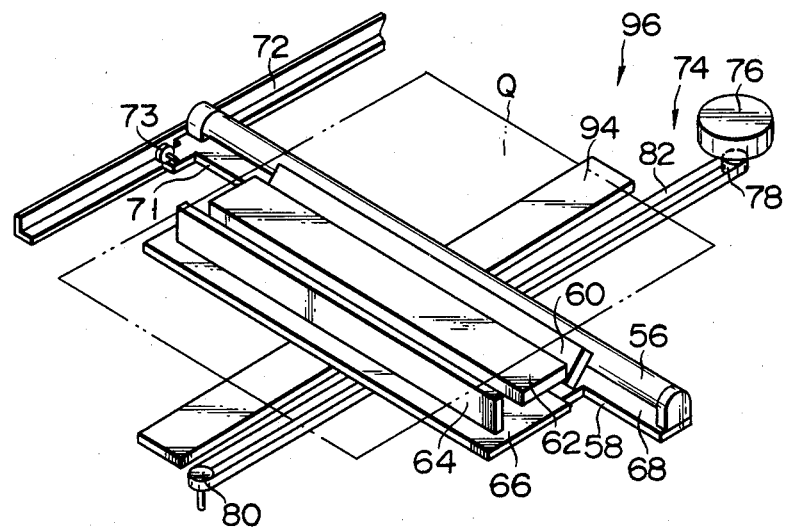
FIG. 9 is a perspective view of the main part of a scanning apparatus according to a fifth embodiment of the present invention.
Figure 10:
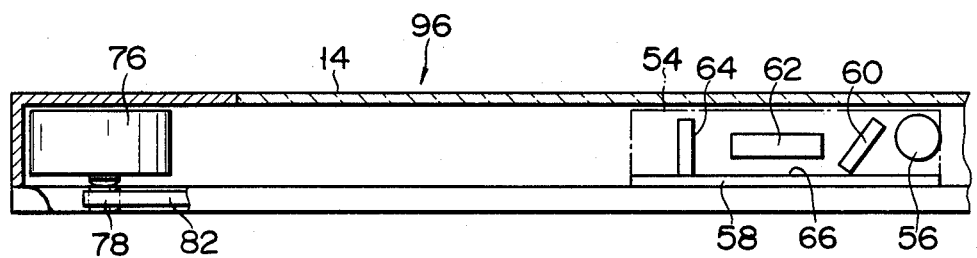
FIG. 10 is a side sectional view schematically showing the main part of the scanning apparatus of FIG. 9.

A scanning apparatus 96 according to a fifth embodiment of the present invention, as shown in FIGS. 9 and 10, is substantially the same as that of the fourth embodiment, except that in this case the motor 76 faces downward, i.e., the main housing of the motor 76 is disposed in a space between a timing belt 82 or carriage 58 and the document table 14. According to this construction, the height of the scanning apparatus 96 can be further decreased by the size of the case of the motor 76, in addition to the effect of the fourth embodiment. The thickness of the scanning apparatus 96 of this fifth embodiment can be smaller than the scanning apparatus 92 of the fourth embodiment.

Figure 13:
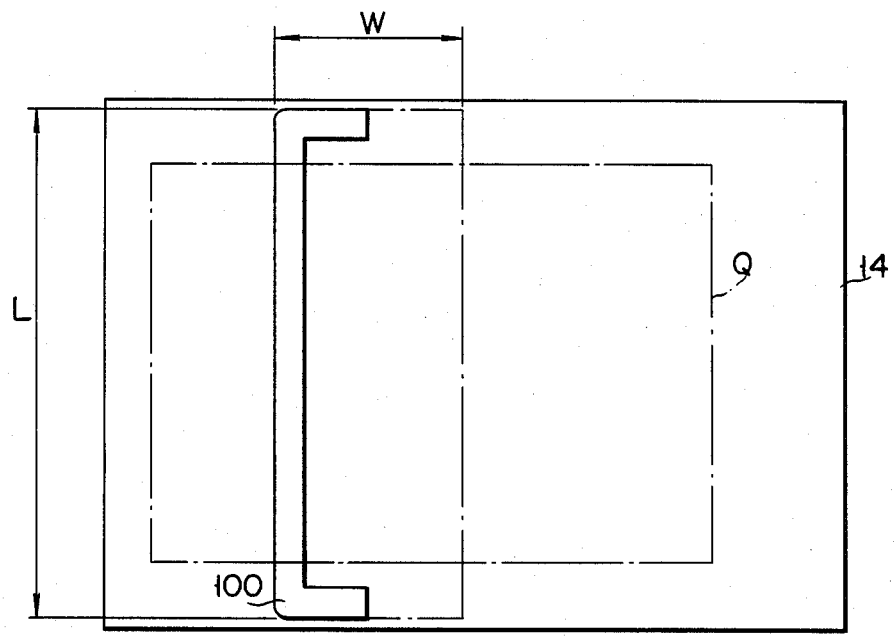
FIG. 13 is a schematic plan view for explaining the operation of the scanning apparatus shown in FIG. 11.

A scanning apparatus 98 according to a sixth embodiment of the present invention, as shown in FIGS. 11 and 13 is substantially the same as that of the first embodiment, except that a substantially U-shaped lamp 100 is used in place of the straight lamp 56 of the first embodiment. In this case, the effective length l3 with respect to the overall length L can be increased. The two end portions of the lamp (fluorescent lamp) are bent and are not included in the overall length L. As a result, the overall length L becomes substantially the same as the effective length l3. As shown in FIG. 13, when an exposure width along the moving direction of the substantially U-shaped lamp 100 is defined as W, the exposure range is given by $W \times l3$. In this case, since the effective length l3 of the substantially U-shaped lamp 100 is substantially the same as the overall length L, the length of the apparatus can be decreased by a distance corresponding to the sum of the lengths of the two end portions of the substantiallly U-shaped lamp 100. In other words, the size of the scanning unit along a direction (of width) perpendicular to the moving direction thereof can be decreased.

Figure 14:
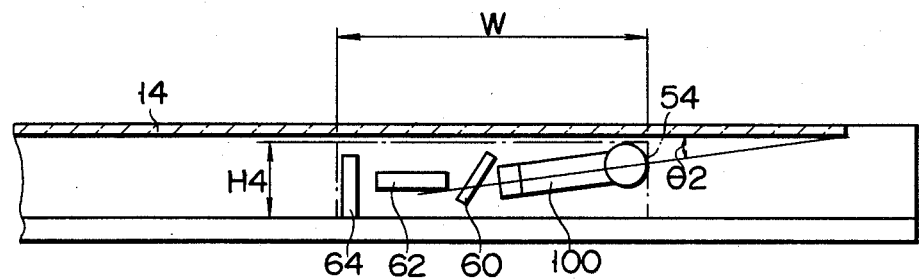
FIG. 14 is a schematic cross-sectional view for explaining the construction of a modification of the exposure lamp of the scanning apparatus shown in FIG. 11.

In the sixth embodiment, as shown in FIG. 14, the substantially U-shaped lamp 100 may be inclined at an angle of $\theta 2$ with respect to the document table 14. In this case, the height of the scanning unit indicated by H4 can be varied in association with the inclination angle $\theta 2$. However, a rod lens array 62 and a CCD image sensor 64 need not be inclined.

Figure 15:
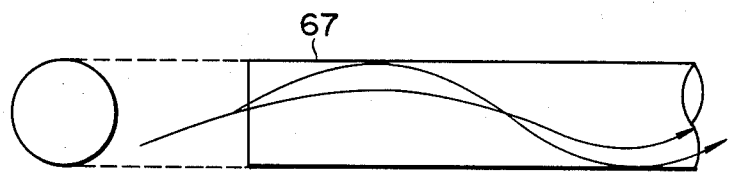
FIG. 15 is a schematic representation for explaining the rod lens commonly used in the scanning apparatuses of the first to sixth embodiments.
Figure 16:
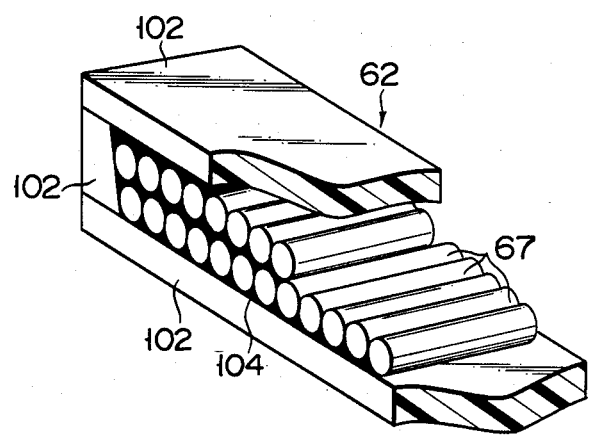
FIG. 16 is a perspective view of the rod lens with part of the rod lens array of FIG. 15 being cut away.
Figure 17:
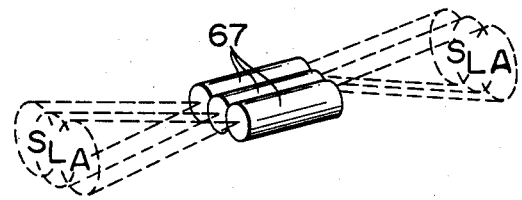
FIG. 17 is a schematic representation for explaining the operation of the rod lens array.

The rod lens 67 or the rod lens array 62 as a light converging means used in each of the embodiments of the present invention will be described with reference to FIGS. 15 to 17. The rod lens (SELFOC lens) 67 is made of optical fibers constituting a columnar shape so as to continuously change the refractive index. Light (indicated by thin lines) incident at one end of the rod lens propagates through the lens while forming a wave with respect to the optical axis thereof. The optical fibers exhibit the same behavior as that of the lens, so that image light incident at one end appears as an erect image of equal size at the other end of the lens. Focusing conditions can change in accordance with changes in the length of the rod lens 67. In general, when the length of the rod lens 67 is increased, the focal depth is also increased. In other words, the longer the rod lens is, the clearer the image becomes. If the rod lens is sufficiently long, it is possible to obtain a clear image even if the document is slightly away from the document table 14. Moreover, adjusting the positioning of the optical system is easy. According to the present invention, the rod lens 67 is arranged to be substantially parallel to the document table 14, and so the length of the rod lens can be arbitrarily increased without changing the height (thickness) of the scanning apparatus.

The rod lens generally has a small diameter and can be used to obtain a very small image having a diameter of about several milimeters. Therefore, according to each of the embodiments of the present invention, the rod lens array 62 comprising a number of rod lenses is used, as shown in FIG. 16. A fiberglass reinforced plastic (FRP) wall 102 surrounds the rod lenses 67. A black silicone resin 104 is filled in the space between every two adjacent lenses.

A plurality (e.g., three in FIG. 17) of rod lenses 67 are aligned to partially overlap their images to obtain an image of wide area. Unlike a so-called fiber plate for producing an image by bright and dark light components from the respective fibers, the rod lens array produces the same image as the real image produced by a spherical lens, so that the resultant image can be projected on a CCD image sensor as a screen in a noncontact manner.

The CCD image sensor used in each of the embodiments of the present invention comprises a plurality of photodiodes aligned so as to convert optical signals to electrical signals. The electrical signals are transferred by a CCD analog register. The CCD image sensor comprises a photosensitive portion, a transfer portion and an output portion. The photosensitive portion transduces light energy to an electrical signal and temporarily stores the signal charge. The transfer portion transfers (scans) the signal charge stored in the photosensitive portion (photosensitive pixel array). The output portion converts the signal charge to a voltage signal.

The present invention is not limited to the particular embodiments described above. Various changes and modifications may be made within the spirit and scope of the invention.

In each of the above embodiments, a mirror is used as the direction changing means for changing the direction of light reflected by the document. However, a prism may be used in place of the mirror to obtain the same effect.

In each of the above embodiments, the document is exposed by moving the carriage with respect to the document table which supports the document thereon. However, the document table may be moved with respect to the carriage to obtain the same effect as any one of the above embodiments.

What is claimed is:

1. A scanning apparatus for scanning image information of a document and generating a signal corresponding to the image information, comprising:
   a document table having at least two opposite ends, for supporting the document thereon;

exposing means for irradiating light on said document table and said supported document, from one end of said document table to said opposite end of said table;

direction changing means for changing a direction of light reflected by the document illuminated by said exposing means along a direction parallel to a longitudinal direction of said document table;

light-converging means for optically converging the light from said direction changing means, said light-converging means including a rod lens array having at least one rod lens, said rod lens being a light-converging fiber, said rod lens array being arranged substantially in parallel with the longitudinal axis of said document table, said rod lens array having a longitudinal length being limited only by the longitudinal length of said scanning apparatus; and photoelectric means for receiving light passing through said light-converging means and for transducing the light to an electrical signal, said photoelectric means being an image sensor.

2. An apparatus according to claim 1, wherein said apparatus comprises an image forming apparatus for forming an image in accordance with the electrical signal corresponding to the image information of the document.

3. An apparatus according to claim 1, wherein said light-converging means comprises a mirror.

4. An apparatus according to claim 1, further comprising a support member for integrally supporting said exposing means, said direction changing means, said light-converging means and said photoelectric means.

5. An apparatus according to claim 4, wherein said support member comprises a drive mechanism which reciprocally moves along the longitudinal direction of said document table under said document table so as to scan the document supported on said document table.

6. An apparatus according to claim 5, wherein said drive mechanism comprises a motor which is arranged in an extended portion of a space between said document table and said support member.

7. An apparatus according to claim 5, wherein said exposing means comprises a substantially linear fluorescent lamp extending along a direction perpendicular to a moving direction of said support member.

8. An apparatus according to claim 5, wherein said exposing means comprises a substantially U-shaped fluorescent lamp having two end portions bent along a moving direction of said support member, thereby obtaining a longer effective length of said U-shaped fluorescent lamp along a direction perpendicular to a moving direction of said support member.

9. An apparatus according to claim 5, wherein said support member comprises a guide member extending along a moving direction of said support member, said guide member being disposed at a substantially center of said support member along a direction perpendicular to the moving direction of said support member.

10. An apparatus according to claim 9, wherein said drive mechanism applies a driving force to a portion of said support member which is positioned in a vicinity of a center of gravity of said support member, whereby moments of force acting on said support member can be decreased.

11. An apparatus according to claim 4, wherein said light-converging means is arranged such that an optical axis thereof is substantially parallel to a surface of said document table.

12. An apparatus according to claim 4, wherein said light-converging means is arranged such that an optical axis thereof is inclined with respect to a surface of said document table.

13. An apparatus according to claim 4, wherein said photoelectric means comprises a charge-coupled device image sensor for transducing the light from said light-converging means to an electrical signal.

14. An apparatus according to claim 13, wherein said charge-coupled device image sensor comprises an amplifier for amplifying the electrical signal.

15. An apparatus according to claim 14, wherein said amplifier is integrally supported by the support member.

16. A scanning apparatus for scanning image information of a document and generating a signal corresponding to the image information, comprising:

a document table for supporting the document thereon;

exposing means for illuminating and exposing the document supported on said document table;

direction changing means for changing a direction of light reflected by the document illuminated by said exposing means along a direction parallel to a longitudinal direction of said document table;

light-converging means for optically converging the light from said direction changing means, said light-converging means being arranged along the direction parallel to the longitudinal direction of said document table, said light-converging means including at least one light-converging fiber, said light-converging fiber being a rod lens, said light-converging means further including a rod lens array having a plurality of rod lenses; and photoelectric means for receiving light passing through said light-converging means and for transducing the light to an electrical signal.

17. A scanning apparatus for scanning image information of a document and generating a signal corresponding to the image information, comprising:

a document table for supporting the document thereon;

exposing means for irradiating light on said document table and said supported document from one end of said document table to said opposite end of said table;

direction changing means for changing a direction of light reflected by the document illuminated by said exposing means along a direction parallel to a longitudinal direction of said document table;

light-converging means for optically converging the light from said direction changing means, said light-converging means including a rod lens array having at least one rod lens, said rod lens being a light-converging fiber, said rod lens array being arranged substantially in parallel with the longitudinal axis of said document table, said rod lens array having a longitudinal length being limited only by the longitudinal length of said scanning apparatus;

photoelectric means for receiving light passing through said light-converging means and for transducing the light to an electrical signal, said photoelectric means being an image sensor;

a support member for integrally supporting said exposing means, said direction changing means, said light-converging means and said photoelectric means; and an optical path direction changing member, disposed between said light-converging means and said photoelectric means, for changing a direction of light passing through said light-converging means, enabling a position of said photoelectric means for receiving the light passing through said light-converging means to be changed in accordance with the direction of light which is selected by said optical path direction changing member.

18. An apparatus according to claim 17, wherein said optical path direction changing member comprises a mirror.

* * * * *